United States Patent Office 2,962,104
Patented Nov. 29, 1960

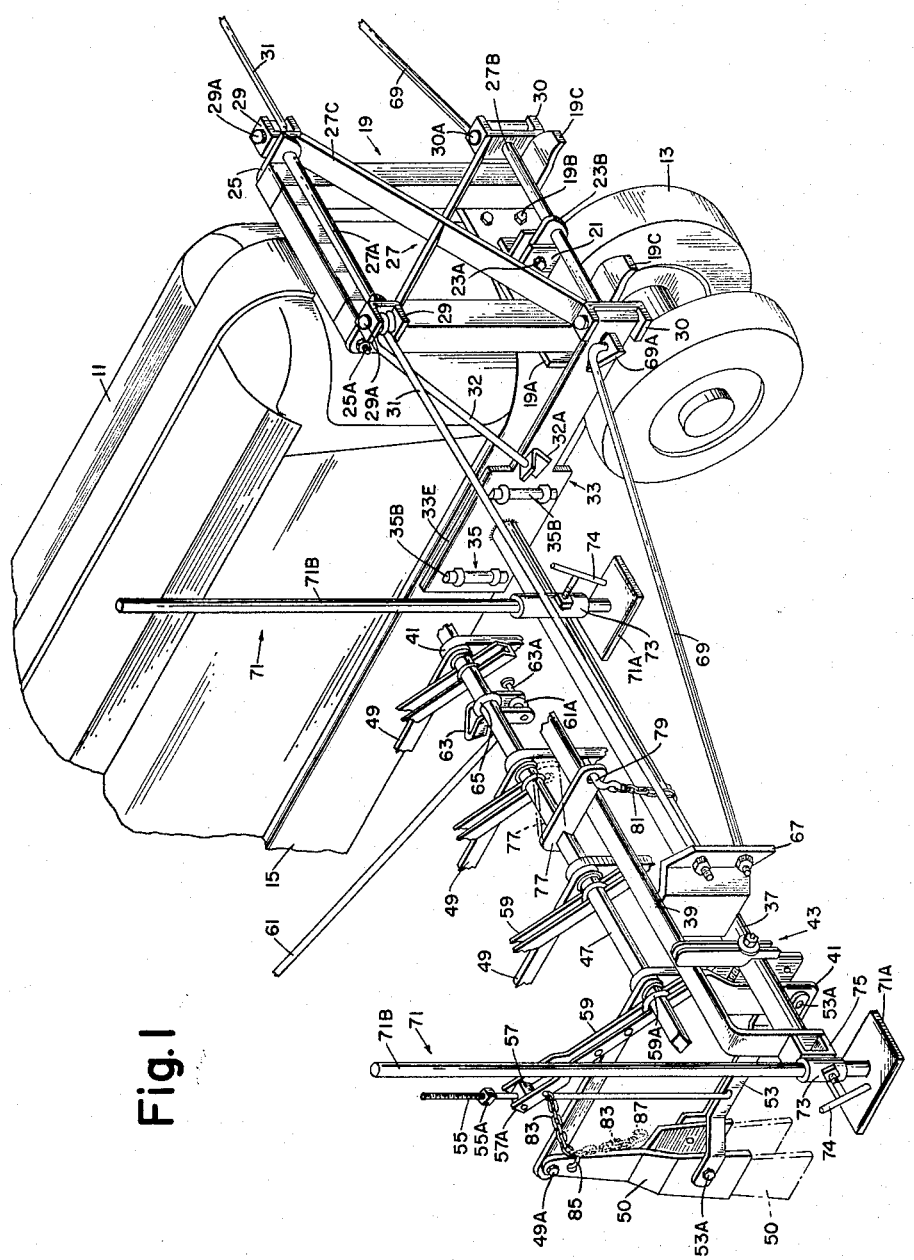

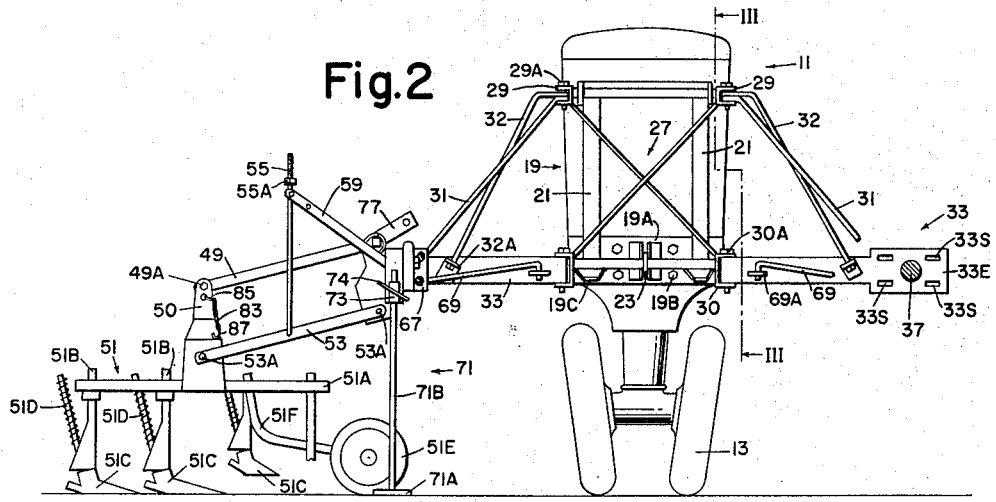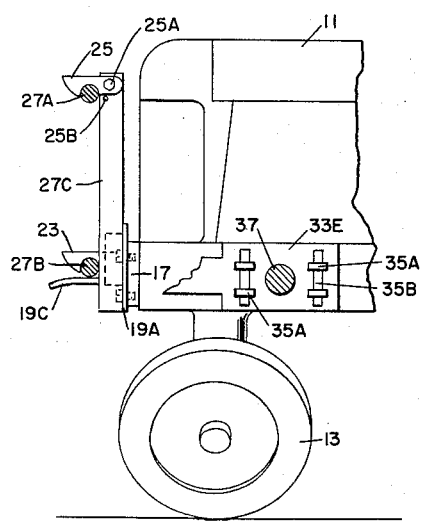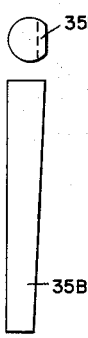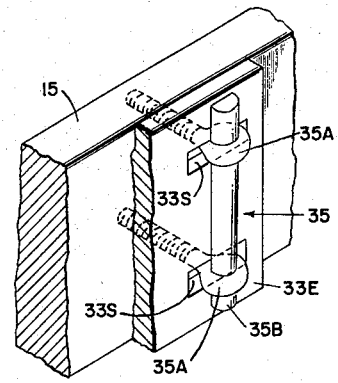
Nov. 29, 1960 M. ANTICI 2,962,104
QUICK-HITCH MEANS FOR ATTACHING AGRICULTURAL IMPLEMENTS TO A TRACTOR
Filed July 11, 1958 2 Sheets-Sheet 2
INVENTOR,
MARINO ANTICI
BY
Weatherford & Weatherford
attys

2,962,104

QUICK-HITCH MEANS FOR ATTACHING AGRICULTURAL IMPLEMENTS TO A TRACTOR

Marino Antici, 1404 Rose Circle, Clarksdale, Miss.

Filed July 11, 1958, Ser. No. 748,056

10 Claims. (Cl. 172—273)

This invention relates to quick-hitch means for attaching agricultural implements to a tractor.

More particularly the invention pertains to quick-hitch means for semi-automatically coupling and easily uncoupling agricultural implements, such as multi-row cultivators, to the front of a tractor, said means including a pair of mating frames, one rigidly fixed to the front of the tractor and the other having bilaterally symmetrical booms supporting gangs of implements laterally swingably mounted thereon, said frames having automatically coupling latch means, said tractor and said booms having quick-detachable means for locking said booms against swinging away from their laterally disposed operative positions during use, said booms having lowerable stands for supporting the booms and their supporting frame at proper tractor-coupling elevation when disconnected from the tractor, and means for temporarily holding said implements in elevated positions while the booms are being swung to and from their tractor-coupled use positions and their ground and stand-supported uncoupled positions.

Specifically the invention is embodied in the multi-row cultivator structure described in the following specification and shown in the accompanying drawings.

The weight and size of agricultural implements of the herein-disclosed type renders the task of coupling and uncoupling the same to and from a tractor very difficult and laborious. Heretofore much heavy lifting and moving of the implements was necessary to bring the tractor and implements into mating positions so that the coupling elements (bolts, pins, etc.) could be fitted into place. The herein disclosed invention makes the coupling and uncoupling operations both quick and easy.

It is accordingly an object of this invention to provide structure for quickly and easily coupling agricultural implements to a tractor, said structure including means for supporting said implement in a rest position greatly facilitating the final uncoupling and the initial coupling operations.

It is another object to provide such structure with simple and easily operated means for holding the ground-working elements of the implement elevated to facilitate movements of the implement parts during the heretofore likewise laborious intermediate coupling and uncoupling operations.

It is a further object to provide structure of this type which is of very simple, economical yet sturdy construction.

It is the overall object to generally improve the design and efficiency of means for quickly coupling and uncoupling tractors and agricultural implements.

The means by which the foregoing and other objects of the present invention are accomplished and the manner of their accomplishment will be readily understood from the following specification upon reference to the accompanying drawings, in which:

Fig. 1 is a fragmentary perspective view showing a tractor and the coupled cultivator with its parts in positions ready to be taken to the field.

Fig. 2 is a fragmentary front elevational view of the showing of Fig. 1, with the parts in rest positions for the final uncoupling or the initial coupling operation.

Fig. 3 is a fragmentary side elevational view of the coupled structure of Fig. 1, in section taken on the stepped planes indicated by the line III—III of Fig. 2.

Fig. 4 is an enlarged perspective view of the tapered-pin fastening means.

Fig. 5 is a plan view of one of the tapered pins.

Fig. 6 is a side elevational view of the pin of Fig. 5.

Referring now to the drawings in which the various parts are indicated by numerals, the numeral 11 generally designates a typical farm-type tractor having a dual-wheel front steering assembly 13 and exposed lateral chassis members 15, bridged at their front ends by the chassis member 17. This is the conventional structure upon which the cultivator disclosed is quickly and easily mountably and demountably coupled by the present invention.

The coupling structure comprises, first, the rigid rectangular O frame 19 conveniently formed of three lengths of square tubing welded together, as shown, to define an inverted U (each tube being easily formed of two angle bars welded together along abutted edges), the O being completed by the welded-on support plate 19A which is in turn fixed to the front face of chassis member 17 as by bolts 19B. Plate 19A has welded to its face a pair of brackets 21 spaced as shown to receive therebetween a latch member 23 held therebetween by its pivot pin 23A. Latch member 23 has a built-on stop portion (not shown) which engages plate 19A to prevent the latch from dropping appreciably below its latching position of Fig. 3. O frame 19 also carries two more self-latching latch members 25 mounted by bolts 25A on the upper lateral faces of the frame 19 and held against dropping objectionably below their latching positions by stop pins 25B. The upwardly curved under faces of latches 23 and 25 cause them to be lifted by a camming action when they engage the rods 27A and 27B when moved to coupling position relative to the X cultivator-supporting frame 27 next to be described. Frame 27 is liftingly guided into latching position by down-curved tongues 19C welded to frame 19.

The cultivator disclosed is mounted on an X-shaped frame formed of welded crossed flat metal bars 27C, the free ends of each having welded thereto the outwardly open C-shaped fixtures 29 and 30. Fixtures 29 and 30 have vertically alined holes in their top and bottom walls to receive pivot pins 29A and 30A which swivelly connect the fixtures 29 and 30, respectively, to the tie rods 31 and 32 and to the swinging chassis-engaging arm 33. Arm 33 is formed of metallic plate and is enlarged at its free end 33E to provide added area for the pin-fastening means 35 later to be described.

The boom for each cultivator assemblage comprises a cylindrical bar 37 welded at its inner end to the enlarged portion 33E of arm 33, and at its free outer end to the downturned end of the second boom element 39 (broken away at its inner end, where it is also welded to plate 33E, not shown). The boom members have a plurality of plow-unit-attaching members 41 clamped against their rear faces by screw-clamps generally designated 43. Attaching members 41 are provided with alined bearing bores through their upper portions to receive the squared plow-lifting shaft 47. Shaft 47 also serves as one pivot pin for each plow-unit-supporting parallelogram linkage system of which each attaching member 41 is the fixed link. Arms 49 are the top links apertured at their ends to fit over shaft 47 at their front ends and to receive the pivot pins 49A by which they are connected to the upper end of the downwardly bifuracted links 50, the lower ends of which support conventional plow units generally designated 51. (Units 51 each comprises a support bar 51A, depending plow shafts 51B, plow blades 51C, spring-type shock absorbers 51D, and a guiding and supporting wheel 51E mounted on arm 51F.) The bottom link of each linkage system is a member 53 formed of two coextensive metal straps welded together along their medial portions and separated at their ends to form yokes spanning the bifurcated lower ends of links 41 and 50 and pivoted thereto by pins 53A.

The plow units 51 are raised and lowered through their linkage supports by lift rods 55, the lower ends of which are bent at right angles and pivotally inserted in holes drilled in the lower link 53, as shown. Lift rods 55 pass upwardly freely through blocks 57 swivelly mounted by trunnions 57A between the branches of the bifurcated arms 59. Blocks 57 lift rods 55 by engaging under nuts 55A length-adjustably threaded thereon. Arms 59 are fixed to the shaft 47 as by U-bolts 59A. Shaft 47 is partially rotated to raise and lower the plow-supporting linkage systems in known manner by a hydraulic cylinder (not shown) on the tractor connected to the shaft 47 by connecting rod 61 looped at its end 61A around pin 63A for pivotal connection thereby to the lower end of lever arm 63 fixed to the shaft 47 by U-bolt 65.

An anchoring plate 67 is welded between the boom elements 37 and 39 and is drilled to receive the nut-anchored ends of the tie rods 31 and 69 which together with rods 32 complete the swinging booms. Welded-on brackets 32A and 69A anchor the ends of tie rods 32 and 69 to the boom-supporting swinging arms 33.

The important tapered-pin locking means 35 comprises eye-bolts 35A (Fig. 4) screwed into tapped bores in the side chassis members 15 and extending outwardly through horizontal slots 33S in the enlarged portions 33E of the arms 33. The locking pins 35B (Figs. 5 and 6) has a flattened plate-engaging face machined on one side thereof at a slight wedging action producing angle, as shown in said figures. The amount of the taper (or undercut) is indicated by the broken line of Fig. 5.

Another important feature of the invention is the provision of pairs of height-adjustable stands 71 for supporting the cultivator structures in and at proper positions and elevations for coupling and uncoupling. Stands 71 comprise pedestal plates 71A and standards 71B welded or otherwise fixed thereto. Standards 71B are height-adjustably received in vertical-axis sockets 73 welded to U-brackets 75 fixed to the ends of booms 37, 39. Wing screws 74 hold the standards at adjusted positions. By the use of a pair of stands for each side of the cultivator, a very stable supporting of the structure results when the booms are swung through approximately 90 degrees from use positions before the stands are lowered for uncoupling and storage of the cultivator. This good support insures that the cultivator will be in position for semi-automatic coupling when its use is again desired. Slight settling of the cultivator resting on soft ground will be compensated for by the lifting effect of coupling tongues 19C described above.

Another very important feature of the present invention is the provision of temporarily usable means for holding the plow units in elevated positions during the swinging of the booms to and from use positions during coupling and uncoupling. One such means is the arm fixed to each of the shafts 47 and apertured at its free end to receive the hook 79 on the chain 81 welded at its fixed end to boom member 37. When the plow units are elevated by the energization of the hydraulic cylinder (not shown) that pulls connecting rod 61, the chain 81 and its hook 79 can be connected to arm 77 as shown in Fig. 1 to hold the plow units elevated during and after disconnection of rod 61 from arm 63 by removal of pin 63A. The other means for temporary elevated support of the plow units comprise the chains 83 fixed by rings 85 looped through apertures in each of the links 50, as best shown in Fig. 1. The hooks 87 on the ends of chains 83 are hooked as shown in full lines through apertures in the plow-lifting arms 59. The non-use positions of the chains 83 are shown in phantom in Fig. 1 and in full lines in Fig. 2.

In dismounting the cultivator the plows are raised by the hydraulic system. Hook 79 is inserted in the hole at the end of arm 77 so that chain 81 will prevent rotation of shaft 47. Now pin 63A can be removed to free rod 61. Next pins 35B can be driven upwardly out of the eyes of bolts 35A permitting the booms to be swung forwardly through approximately 90 degrees, more or less as desired. A light hammer tap will unhook hook 79 allowing the plow units to fall to the ground. Then wing screws 74 are loosened and stands 71 lowered to supporting positions and clamped therein by tightening screws 74. When both sides of the cultivator are thus positioned, the operator manually lifts latches 23 and 25 and the tractor can be backed away.

In mounting the cultivator, the driver assures the lowered position of the latches 23 and 25 to automatic coupling positions and drives the tractor forwardly until the frames 19 and 27 automatically couple as shown in Figs. 1 and 3. Stands 71 are now raised and locked up by screws 74. Next each unit or gang of the cultivator is raised and hooked in elevated position by the chain 81. The booms can now be swung rearwardly until the arm 33 engages the chassis member 15. Wedge pins 35B are next driven into the eyes of bolts 35A to lock the boom in use position. Connecting rod 61 is connected to arm 63 by pin 63A. Finally chains 83 are unhooked and the implement is ready to go to the field.

While I have disclosed a preferred embodiment of my invention, it is to be understood that many changes can be made in the size, shape, composition, and arrangement of the parts without departing from the spirit of the invention as defined by the subjoined claims.

I claim:

1. Quickly attachable and detachable tractor-operated agricultural apparatus, comprising: a frame adapted for relatively permanent attachment to an end of a farm-type tractor, an implement-carrying frame adapted for mating connection to the first said frame, automatically coupling and manually uncoupling mating sets of latch means each carried in part by each of said frames, a pair of normally laterally extending booms connected one to each side of said implement-carrying frame for horizontal swinging thereon, said booms including arms fixed thereto and adapted to extend along the side portions of said tractor for holding said booms in laterally extended use positions, cooperating quick-acting locking means for said arms carried in part by each of said arms and said tractor, a height-adjustable stand attached adjacent each end of each boom for supporting said booms and thereby said implement-carrying frame in position and elevation for quick and easy coupling and uncoupling of said frames, vertically movable implement-carrying means mounted on each of said booms, means, including a detachable connector, operable from said tractor for raising and lowering said implement-carrying means during use, means comprising a chain and a lever for temporarily locking parts of said last-mentioned means to hold said implement-carrying means in elevated position to facilitate movement of said booms from use positions toward storage positions, and individual means for locking each of said implement-carrying means in manually raised positions to facilitate swinging of said booms to use positions from storage positions.

2. Structure according to claim 1, said end of said tractor being the front end thereof.

3. Structure according to claim 1, and additionally including cam-like elements carried by one of said frames and engageable with parts of the other thereof to insure proper mating engagement of said mating sets of latch means during the coupling operation.

4. Quickly attachable and detachable tractor-operated agricultural apparatus, comprising: a frame adapted for relatively permanent attachment to an end of a farm-type tractor, an implement-carrying frame adapted for mating connection to the first said frame, automatically coupling and manually uncoupling mating sets of latch means each carried in part by each of said frames, a pair of normally laterally extending booms connected one to each side of said implement-carrying frame for horizontal swinging thereon, said booms including arms fixed thereto and adapted to extend along the side portions of said tractor for holding said booms in laterally extended use positions, cooperating quick-acting locking means for said arms carried in part by each of said arms and said tractor, a height-adjustable stand attached adjacent each end of each boom for supporting said booms and thereby said implement-carrying frame in position and elevation for quick and easy coupling and uncoupling of said frames, vertically movable implement-carrying means mounted on each of said booms, means, including a detachable connector, operable from said tractor for raising and lowering said implement-carrying means during use, and means comprising a chain and a lever for temporarily locking parts of said last-mentioned means to hold said implement-carrying means in elevated position to facilitate movement of said booms from use positions toward storage positions.

5. Structure according to claim 4, said end of said tractor being the front end thereof.

6. Structure according to claim 4, and additionally including cam-like elements carried by one of said frames and engageable with parts of the other thereof to insure proper mating engagement of said mating sets of latch means during the coupling operation.

7. Quickly attachable and detachable tractor-operated agricultural apparatus, comprising: a frame adapted for relatively permanent attachment to an end of a farm-type tractor, an implement-carrying frame adapted for mating connection to the first said frame, latch means for coupling and uncoupling said frames, a pair of normally laterally extending booms connected one to each side of said implement-carrying frame for horizontal swinging thereon, means for holding said booms in laterally extended use positions, a height-adjustable stand attached adjacent each end of each boom for supporting said booms and thereby said implement-carrying frame in position and elevation for quick and easy coupling and uncoupling of said frames, vertically movable implement-carrying means mounted on each of said booms, means, including a detachable connector, operable from said tractor for raising and lowering said implement-carrying means during use, and means comprising a chain and a lever for temporarily locking parts of said last-mentioned means to hold said implement-carrying means in elevated position to facilitate movement of said booms from use positions toward storage positions.

8. Structure according to claim 7, and additionally including cam-like elements carried by one of said frames and engageable with parts of the other said frame to insure proper coupling engagement of said latch means during the coupling operation.

9. Quickly attachable and detachable tractor-operated agricultural apparatus, comprising: a frame adapted for relatively permanent attachment to an end of a farm-type tractor, an implement-carrying frame adapted for mating connection to the first said frame, latch means for coupling and uncoupling said frames, a pair of normally laterally extending booms connected one to each side of said implement-carrying frame for horizontal swinging thereon, means for holding said booms in laterally extended use positions, a height-adjustable stand attached adjacent each end of each boom for supporting said booms and thereby said implement-carrying frame in position and elevation for quick and easy coupling and uncoupling of said frames, vertically movable implement-carrying means mounted on each of said booms, means, including a detachable connector, operable from said tractor for raising and lowering said implement-carrying means during use, and means comprising a shiftable lever and restraining means detachably engaging said lever in shifted position for temporarily locking parts of said last-mentioned means to hold said implement-carrying means in elevated position to facilitate movement of said booms from use positions toward storage positions.

10. Quickly attachable and detachable tractor-operated agricultural apparatus, comprising: a frame adapted for relatively permanent attachment to an end of a farm-type tractor, an implement-carrying frame adapted for mating connection to the first said frame, latch means for coupling and uncoupling said frames, a pair of normally laterally extending booms connected one to each side of said implement-carrying frame for horizontal swinging thereon, means for holding said booms in laterally extended use positions, a height-adjustable stand attached to each boom for supporting said booms and thereby said implement-carrying frame in position and elevation for quick and easy coupling and uncoupling of said frames, each said boom including a laterally extending rotatable shaft, vertically movable implement-carrying means fixed on the shaft of each of said booms, means, including detachable connector, operable from said tractor for rotating said shaft and raising and lowering said implement-carrying means during use, and means comprising a lever connected to said shaft for rotating said shaft, and detachable means for restraining said lever in shaft-rotated position for temporarily locking parts of said last-mentioned means to hold said implement-carrying means in elevated position to facilitate movement of said booms from use positions toward storage positions.

References Cited in the file of this patent

UNITED STATES PATENTS

| | | |
|---|---|---|
| 2,423,148 | Johnson | July 1, 1947 |
| 2,584,217 | Morkoski | Feb. 5, 1952 |
| 2,667,708 | Gjesdahl | Feb. 2, 1954 |